April 30, 1957 W. M. DOW 2,790,248
MEANS FOR REGENERATING ADSORBENT BEDS
Filed July 29, 1954
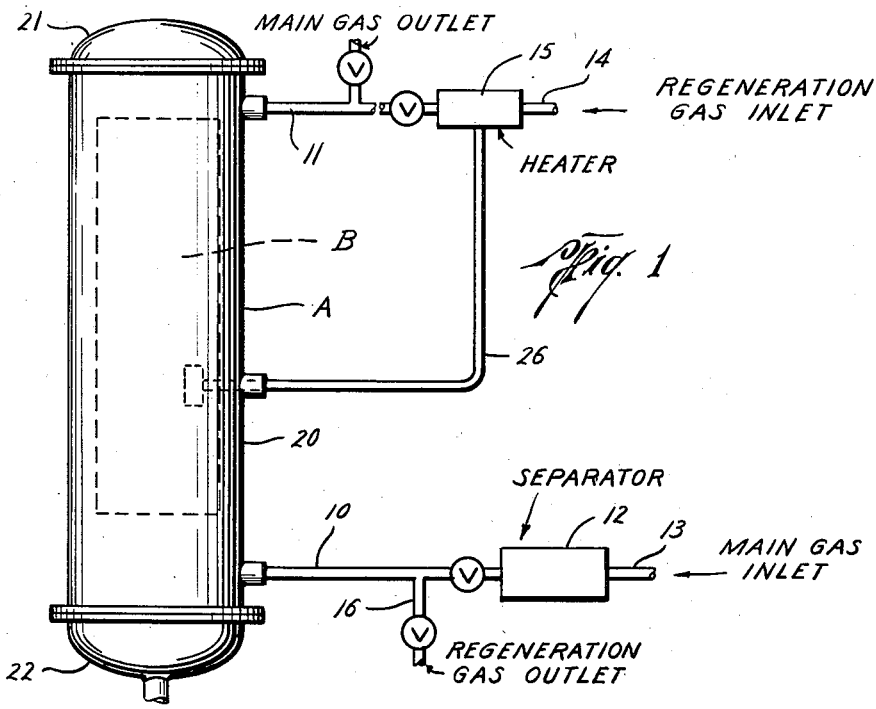
Fig. 1
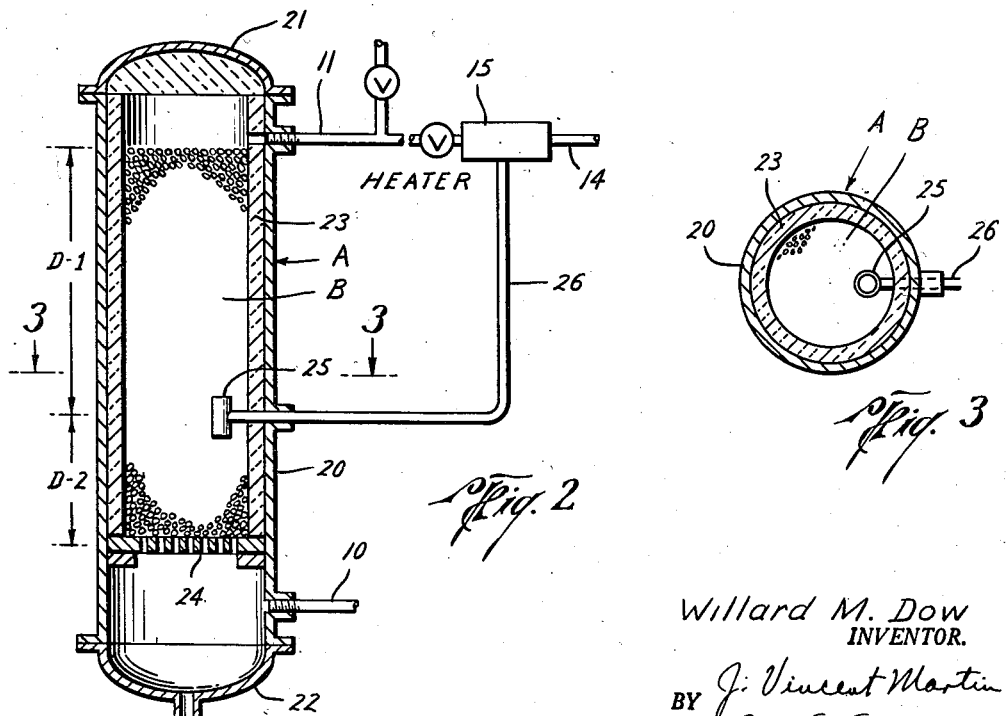
Fig. 2
Fig. 3
Willard M. Dow
INVENTOR.
BY J. Vincent Martin
Joe E. Edwards
B. R. Pravel
ATTORNEYS

United States Patent Office 2,790,248
Patented Apr. 30, 1957

2,790,248

MEANS FOR REGENERATING ADSORBENT BEDS

Willard M. Dow, Shreveport, La., assignor to United Gas Corporation, Shreveport, La., a corporation of Delaware Application July 29, 1954, Serial No. 446,604

5 Claims. (Cl. 34—48)

This invention relates to new and useful improvements in methods of and means for regenerating adsorbent beds.

The invention is particularly applicable for use in gas dehydration and processing apparatus wherein a bed of desiccant or similar adsorbing material is employed for adsorbing liquid fractions from fluid streams and relates to an improved method and means for regenerating said desiccant bed.

It has been the general practice to regenerate the conventional desiccant bed by passing a hot regenerating gas stream through the bed until the entire bed has been heated to approximately the temperature of the regenerating gas stream which effects a vaporization of the adsorbed water. Although this practice results in regeneration of the bed, it also entails the use of more heat than is actually necessary, which materially increases costs incident to the heater and condenser requirements, together with the associated piping, valves, etc., and in addition lengthens the time of the regeneration cycle.

It is, therefore, one object of this invention to provide an improved method and apparatus for regenerating beds of desiccant or other adsorbing material, which method not only results in appreciable economic savings in heater and condenser requirements, but also reduces the time of the regeneration cycle.

An important object is to provide an improved method and means of regeneration wherein a portion of the desiccant bed is utilized as a heat regenerator so that the heat within the completely regenerated portion of the bed is utilized to complete the regeneration operation, whereby minimum heat is required to effect the regeneration and condenser requirements are materially lessened.

Another object is to direct a flow of hot regenerating gas into one end of a relatively elongate desiccant bed until a predetermined portion of the bed is heated and regenerated, after which the circulation of hot gas is halted and a cool gas stream is substituted therefor; said cool gas being heated by the transfer of heat from the regenerated portion and functioning upon passage through the remainder of the desiccant bed to heat and regenerate said remainder of the bed to complete the regeneration operation.

A further object is to provide a method and means, of the character described, wherein the desiccant bed acts as a heat regenerator so that the heat within the inlet side or portion of the desiccant bed is transferred to a relatively cool gas stream which is thereby heated and then passed through the remainder or outlet portion of the bed; the heat transfer to the gas stream simultaneously effecting a cooling of the desiccant bed in preparation for the subsequent adsorbing operation to thereby minimize the overall regeneration cycle.

Still another object is to provide an improved apparatus, of the character described, wherein the desiccant bed is suitably insulated from the vessel in which it is mounted and also wherein said bed is of sufficient length to permit it to function as a heat regenerator.

Another object is to provide an improved apparatus of the character described, having a temperature responsive control unit mounted within the desiccant bed at a predetermined point therein and adapted to be connected in a manner to control the heat of the regeneration gas stream passing to the desiccant bed, whereby when said bed reaches a predetermined temperature said control unit is actuated to control the heat of the regeneration gas stream.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is an elevation of a dehydration or processing apparatus, constructed in accordance with the invention, Figure 2 is a vertical, sectional view of the desiccant tower, and Figure 3 is a horizontal, cross-sectional view, taken on the line 3—3 of Figure 2.

In the drawings, the letter "A" designates a desiccant tower which may be of any suitable construction. As is well known, desiccant towers are employed in gas dehydrating or processing apparatus and include a bed "B" of adsorbing or desiccant material. As shown in Figure 1, the desiccant tower has a main gas inlet pipe 10 connected in its lower end, and an outlet pipe 11 extending from its upper end. The inlet pipe 10 leads from a separator 12 which has connection with a main gas conductor 13. When the desiccant tower is on an adsorbing or dehydrating cycle, the main gas stream flows from the conductor 13, through separator 12, inlet pipe 10 and upwardly through the desiccant pack "B" within the tower "A." The gas escapes from the upper end of the tower through the outlet line 11.

When the desiccant material within the bed or pack "B" has become saturated, it is normal practice to circulate a hot regenerating gas downwardly through the desiccant bed in a direction opposite to the normal direction of flow during the dehydrating cycle. The regeneration gas is conducted to what is normally the outlet line 11 through a branch pipe 14 and connected in this branch pipe is a suitable heater 15 which heats the regeneration gas stream to the desired temperature. The regeneration gas enters the upper end of the desiccant tower "A" through the line 11 and flows downwardly through the desiccant material to escape through pipe 10. A regeneration gas outlet 16 branches from the pipe 10 and suitable valves control the switching of flow through the tower "A."

The foregoing is a normal dehydrating apparatus with flow being through the desiccant bed on a dehydration cycle and then being switched or reversed, at which time regeneration gas is directed through the bed. It has been the practice to heat the regeneration gas to a temperature which will effectively regenerate the desiccant material and to continue the flow of hot regeneration gas through the desiccant bed until the material thereof has been completely regenerated. In such instance, the entire desiccant bed is brought up to substantially the same heat as the heat of the regeneration gas, and this means that the entire bed is heated to substantially the same temperature. At some other point in the system, the regeneration gas has its heat extracted by some suitable condenser (not shown), and after complete regeneration of the bed, the various valves are operated to again place the tower upon a dehydration cycle.

The present invention contemplates employing the desiccant bed as a heat regenerator so that appreciable economic savings in heater and condenser requirements may be effected; also, with the present invention, the times of the regeneration cycle may be reduced. Referring to Figure 2, the desiccant tower comprises a generally cylindrical vessel 20 which has the inlet pipe 10 connected to its lower end with the outlet line 11 connected at its upper end. Suitable closures 21 and 22 close the upper and lower ends of the vessel whereby flow through the vessel is from the pipe 10 to the line 11 or vice versa. The wall of the vessel 20 is suitably insulated by annular insulating material 23, and the desiccant bed or pack "B" is contained within the interior of the vessel and is insulated from the wall thereof by said insulation. The desiccant material is supported upon a suitable perforated plate 24 which extends transversely across the interior of the vessel.

When the tower "A" is on a dehydrating or processing cycle, flow of a main gas stream is upwardly through the desiccant bed "B" and outwardly through line 11. Upon the regeneration cycle, the regeneration gas is introduced through line 11, flows downwardly through the desiccant bed "B" and is discharged through line or pipe 10. As explained, the heater 15 is mounted in the branch line 14, which constitutes the regeneration gas inlet line, and said heater is adjusted to heat the regeneration gas to the necessary or desired temperature whereby the desiccant bed is heated and the previously adsorbed liquids are removed from the desiccant bed.

In carrying out the present invention, a temperature responsive element 25 is mounted within the desiccant bed "B" at a predetermined selected location with respect to the ends of said bed. The temperature responsive element may be connected by any suitable line 26 with the burner (not shown) of the heater 15, and said temperature-responsive element is so arranged that, when the temperature within the bed at the point where said element is mounted reaches a predetermined selected temperature, the operation of the heater is halted. It is preferable that the temperature-responsive element 25 be disposed at a point within the desiccant bed which is at least one-half the distance of the bed; preferably, the element is located approximately two-thirds of the total distance of the bed from the upper end thereof. As shown in Figure 2, the distance designated D-1 is the distance from the upper end of the bed to the temperature-responsive element, while the distance D-2 is the distance from the temperature-responsive element to the lower end of the bed. This has been found to be a satisfactory location of the element 25, but said location is subject to considerable variation. However, as a practical matter, it is usually desirable that the element 25 be located not nearer the inlet end than one-half the total length of the bed.

In the operation of the apparatus, the temperature-responsive element 25 is set for a predetermined temperature, and such temperature is usually that of the regeneration gas stream. This temperature is sufficient to effect a regeneration of the desiccant material.

After proper setting of the temperature element, the regeneration gas is introduced through line 11 and passes downwardly through the desiccant material of the bed "B." Since it is flowing from the upper to the lower end of the desiccant bed, it is evident that the hot regeneration gas will progressively regenerate the bed beginning with its upper end and gradually effecting regeneration toward its lower end. During the regeneration operation, it is apparent that the bed is progressively heated from its upper toward its lower end, and as the temperature increases, adjacent the temperature responsive element 25, such increase indicates that regeneration is occurring. When the material of the bed adjacent the position of the temperature responsive element 25 is heated to the point where this material is regenerated, the temperature responsive element 25 responds and cuts off the operation of the heater 15. At this time, that portion of the bed within the area represented by the indication d-1 has been completely regenerated, but the material within the area d-2 lacks complete regeneration.

When the heater 15 is shut off by the action of the temperature responsive element 25, circulation of the regeneration gas continues, but this gas is introduced into the upper end of the tower in an unheated condition. This relatively cool gas flows downwardly through the heated portion of the desiccant bed "B" and a heat transfer occurs whereby the gas is heated and the desiccant material in the area d-1 is cooled. The gas which is heated in passing through the hot regenerated portion of the bed then contacts the desiccant material in the area beyond the temperature responsive element 25, that is, the material within the area d-2. This gas stream has picked up sufficient heat from the upper portion of the desiccant bed to heat and regenerate the desiccant within area d-2 and, thereby, complete the regeneration operation. It is, therefore, obvious that the heat of the regenerated portion of the desiccant bed is utilized to complete the regeneration of the remainder of the bed. At the same time, the unheated gas which is circulated through the desiccant bed functions to cool the bed more rapidly, and thus by the time the desiccant bed is completely regenerated, the cooling of the bed has begun to take place, and this results in a shortened overall regeneration cycle.

The provision of the temperature responsive element 25 which controls the heating of the regeneration gas makes it possible to regenerate the desiccant bed with a minimum amount of heat. Actually, the heating of the regeneration gas is shut off prior to the time that the desiccant bed is completely regenerated and the heat which is retained by the regenerated portion of the bed is transferred to the unregenerated portion to effect the completion of the regeneration operation. By properly locating the temperature responsive element and by properly controlling the heat of the regeneration stream, it is possible to obtain maximum efficiency for the amount of heat provided in the gas stream. The heating and regeneration occurs progressively, and, thus, the temperature responsive element 25 is so situated with respect to the length and size of the bed that the heat which is within the regenerated portion is sufficient to complete regeneration of the entire bed. Not only is the heating of the bed progressive, but the cooling of the bed is also progressively accomplished, for it is evident that as the unheated gas stream passes through that portion d-1 of the bed, it picks up the heat therefrom and, thus, the bed is progressively cooled. By the time that the desiccant bed is completely regenerated, the upper portion of the bed is already being cooled and, thus, the desiccant tower will be cooled more rapidly in preparation for the next or dehydration or processing cycle. This minimizes the overall time required for one regeneration cycle, and is of distinct advantage from this standpoint.

The desiccant bed has been illustrated and described as disposed with its axis in a vertical plane, and this is the preferable orientation of the bed; also, flow of regeneration gas has been indicated as downwardly through the bed, but, obviously, flow may be in either direction.

The invention is not to be limited to any particular type of temperature-responsive element and, as a matter of fact, is not to be restricted to a temperature-responsive element as the only means of control. The operation may be controlled by a timing mechanism which, by predetermined calculation, will shut off the flow of heated regeneration gas and direct a flow of unheated gas through the bed when the area D-1 has been regenerated. It is also pointed out that, if desired, a by-pass around the heater could be employed, and, when area D-1 has been regenerated, flow will be directed through the by-pass in place of shutting off said heater, as herein described. So long as this particular control mechanism which is selected operates to prevent any further hot regenerating gas from passing into the vessel after the desired portion of the desiccant bed has been heated and thereafter permits a cool gas stream to be introduced, the purposes of the invention will be accomplished.

It is, of course, obvious that the invention is applicable to any type of construction of desiccant tower and any type of desiccant bed. By minimizing the amount of heat necessary for regeneration, the heating requirements are lessened, and a definite reduction in the requirements of the condensing equipment is produced, whereby a substantial economic saving is effected.

The foregoing disclosure and description of the invention is illustrative and explanatory thereof, and various changes in the size, shape and materials, as well as in the details of the illustrated construction may be made within the scope of the appended claims without departing from the spirit of the invention.

What is claimed is:

1. An apparatus for regenerating a bed of adsorbing material which includes, a vessel having a bed of adsorbing material disposed longitudinally therein, means for introducing a regenerating gas into one end of the bed and for discharging the same from the opposite end, means for heating said gas prior to its passage to the bed whereby the hot gas progressively heats and regenerates the bed, temperature-responsive means mounted within the bed at a selected distance from that end of the bed through which the regenerating gas is introduced, and control means connected with the heater means and actuated by said temperature responsive means for shutting off said heater means to halt further heating of the regenerating gas when a predetermined portion of the bed has been heated and regenerated and prior to the heating and regeneration of the entire bed and means for thereafter directing the hot gas which is within the regenerated portion of the bed into and through the remaining portion of said bed to thereby transfer heat from the regenerated portion of the bed to the remainder thereof to heat and regenerate said remainder and thereby complete the regeneration operation.

2. An apparatus as set forth in claim 1, wherein the temperature-responsive means is spaced from that end of the bed through which the gas is introduced by a distance which is equal to at least one-half the total length of the bed.

3. An apparatus for regenerating a bed of adsorbing material which includes, a vessel having a bed of adsorbing material therein, means for directing a flow of gas through said bed longitudinally thereof from the inlet to the outlet thereof, heating means for heating said gas whereby the hot gas progressively heats and regenerates said bed, means responsive to the temperature of the bed and disposed within the bed intermediate its end for shutting off the heating means and halt subsequent heating of the gas when a predetermined portion of the bed has been heated and regenerated and prior to the time that the entire bed has been heated and regenerated, and means for thereafter moving the hot gas which is within the regenerated portion of the bed into and through the remaining portion of the bed to heat said remaining portion and complete regeneration of the entire bed.

4. An apparatus for regenerating a bed of adsorbing material which includes, a vessel having a bed of adsorbing material therein, means for directing a flow of gas through said bed longitudinally thereof from the inlet to the outlet thereof, heating means for heating said gas whereby the hot gas progressively heats and regenerates said bed, means responsive to the temperature of the bed and disposed within the bed intermediate its end for shutting off the heating means and halt subsequent heating of the gas when a predetermined portion of the bed has been heated and regenerated and prior to the time that the entire bed has been heated and regenerated, and means for thereafter directing a relatively cool gas into the inlet end of the bed to move the hot gas which is within the regenerated portion of the bed through the remainder thereof and to also cool the bed following regeneration thereof.

5. An apparatus for regenerating a bed of adsorbing material which includes, a vessel having a bed of adsorbing material disposed longitudinally therein, means for introducing a regenerating gas into one end of the bed and for discharging the same from the opposite end, means for heating said gas prior to its passage to the bed whereby the hot gas progressively heats and regenerates the bed, a control means for said heating means, and means for sensing the temperature of the bed and for actuating the control means to shut off the heating means when a predetermined portion of the bed has been heated and regenerated and prior to the heating and regeneration of the entire bed, and means for thereafter transferring the heat which is within the regenerated portion into and through the remaining portion of the bed to regenerate said remainder without the application of any further heat by the heating means.

References Cited in the file of this patent

UNITED STATES PATENTS

| | | |
|---|---|---|
| 1,863,656 | Hartman | June 21, 1932 |
| 2,520,871 | Wright | Aug. 29, 1950 |
| 2,535,902 | Dailey, Jr. | Dec. 16, 1950 |
| 2,562,334 | Roberts | July 31, 1951 |
| 2,642,943 | Smith | June 23, 1953 |
| 2,661,808 | Kahle | Dec. 8, 1953 |